US009193535B2

(12) United States Patent
Tanaka

(10) Patent No.: US 9,193,535 B2
(45) **Date of Patent: *Nov. 24, 2015**

(54) FOOD MANAGEMENT SYSTEM

(71) Applicant: KURA CORPORATION LTD., Osaka (JP)

(72) Inventor: Kunihiko Tanaka, Osaka (JP)

(73) Assignee: KURA CORPORATION LTD., Osaka (JP)

( * ) Notice: Subject to any disclaimer, the term of this patent is extended or adjusted under 35 U.S.C. 154(b) by 183 days.

This patent is subject to a terminal disclaimer.

(21) Appl. No.: 13/957,811

(22) Filed: Aug. 2, 2013

(65) Prior Publication Data

US 2014/0046480 A1 Feb. 13, 2014

(30) Foreign Application Priority Data

Aug. 10, 2012 (JP) ................................ 2012-177737

(51) Int. Cl.

*G07F 9/10* (2006.01)
*B65G 43/08* (2006.01)
*A47F 10/06* (2006.01)

(52) U.S. Cl.

CPC ................ *B65G 43/08* (2013.01); *A47F 10/06* (2013.01); *G07F 9/105* (2013.01)

(58) Field of Classification Search

CPC ................................ A47F 10/06; G07F 9/105
See application file for complete search history.

(56) References Cited

U.S. PATENT DOCUMENTS 5,579,952 A * 12/1996 Fiedler et al. ............. 221/150 A
6,102,162 A * 8/2000 Teicher ............................ 221/2
7,243,758 B2 * 7/2007 Ishino et al. .................... 186/49
7,810,427 B2 * 10/2010 Ishino et al. .................... 99/483
7,899,709 B2 * 3/2011 Allard et al. .................... 705/23
8,550,229 B2 * 10/2013 Tanaka ....................... 198/465.1
2009/0294217 A1 * 12/2009 Tanaka et al. .................. 186/49

FOREIGN PATENT DOCUMENTS

JP 8-414 1/1996

* cited by examiner

*Primary Examiner* — Timothy Waggoner
(74) *Attorney, Agent, or Firm* — Wenderoth, Lind & Ponack, L.L.P.

(57) ABSTRACT

In a food management system for managing a food carried by a food plate carrier put on the conveyor line, the food plate carrier comprises a mounting platform having a plate resting portion for resting thereon a plate, and a cover for covering the plate resting portion, the cover being attached to the mounting platform in such a manner as to open and close with respect to the plate resting portion, and the food management system comprises an IC tag attached to the food plate carrier, a reader for reading data on the food from the IC tag, an open-close detector for detecting opening and closing of the cover of the food plate carrier, and a controller for computing data on the food, based on the data read by the reader and the data on the opening and closing of the cover detected by the open-close detector.

4 Claims, 9 Drawing Sheets

FOOD MANAGEMENT SYSTEM

BACKGROUND OF THE INVENTION AND RELATED ART STATEMENT

1. Field of the Invention

The present invention relates to a food management system for managing food carried by a food conveying apparatus.

2. Description of Related Art

A restaurant commonly known as a revolving self-service sushi restaurant adopts a food conveying apparatus including a conveyor line to encircle tables. In this type of restaurant, a cook puts food such as sushi on e.g. a plate and then feeds the plate into the encircling conveyor line of the food conveying apparatus to transport it to the tables in order. A customer selects the food such as sushi of his/her choice from the foods conveyed in order, taking it out from the conveyor line.

The sushi restaurant having this food conveying apparatus involves the problems that the sushi conveyed is easy to dry and may possibly be touched by mistake by other customers. It is accordingly desired to provide the sushi sanitarily and prevent the sushi from drying.

To solve the problems, the applicant previously proposed a food plate carrier comprising a mounting platform having a plate resting portion for resting thereon a plate on which food is put, a cover which is attached to the mounting platform in such a manner as to open and close with respect to the plate resting portion, to cover the plate resting portion of the mounting platform, and an open and close mechanism for allowing the cover to close when the plate is rested on the plate resting portion and open when the plate is removed therefrom.

Meanwhile, in the case of the food conveying apparatus mentioned above, if the cook(s) in the kitchen can get the data on the number and the kind of the food taken out from the food plate carriers among the number of the served food on an as-needed basis, he/she can do the cooking and serving more smoothly.

Also, the food conveying apparatus mentioned above involves the problem that the food fed onto the conveyor line continue to go around along the encircling conveyor line until being taken out by the customers. If not taken out from the conveyor line for a long time, the food served will lose freshness as the time passes, and as a result, the food that is beginning to lose freshness may be provided for the customers.

Under the circumstances, according to a related art, for example an IC tag is attached to each plate on which the food is served and the data written in the each IC tag of the plate conveyed is read out by a reader, so that the contents of the food eaten are discriminated on an as-needed basis by a controller and then are informed to the kitchen, to provide an improved efficiency of the kitchen work, or the food remaining in excess of a predetermined time can be discriminated from the foods fed on the conveyor line so that it can be removed from the conveyor line (See JP Unexamined Patent Publication No. Hei 8-414).

However, since for example a restaurant of the size of about 200-seats usually needs a large number of plates of the order of 1,600 plates, if the IC tags are attached to all the plates, there arises the problem of increase in initial cost as a whole.

SUMMARY OF THE INVENTION

In the light of the actual situation mentioned above, the present invention has been made, noting that the restaurant of the size of e.g. 200-seats requires about 1,600 plates, as mentioned above, but just requiring about 500 food plate carriers of not more than one third of the required number of plates. It is an object of the present invention to provide a food management system that can provide a reliable food management at a reduced initial cost by making efficient use of the food plate carriers.

In order to accomplish the object mentioned above, the invention according to Claim 1 provides a food management system for managing the food which is carried with its contained in a food plate carrier put on a conveyor line of a food conveying apparatus, wherein the food plate carrier comprises a mounting platform having a plate resting portion for resting thereon a plate on which food is put, and a cover for covering the plate resting portion of the mounting platform, the cover being attached to the mounting platform in such a manner as to open and close with respect to the plate resting portion, wherein the food management system comprises an IC tag attached to the food plate carrier, a reader for reading data on the food from the IC tag of the food plate carrier carried via the conveyor line, an open-close detector for detecting opening and closing of the cover of the food plate carrier, and a controller for computing data on the food carried via the conveyor line, based on the data read by the reader and the data on the opening and closing of the cover detected by the open-close detector.

The invention according to Claim 2 provides the food management system according to Claim 1, wherein data on the food eaten are calculated by the computer, based on the data from the reader and the data from the open-close detector.

The invention according to Claim 3 provides the food management system according to Claim 1, wherein data on the food remaining on the conveyor line without being eaten for a predetermined time are calculated by the controller, based on the data from the reader and the open-close detector.

According to the present invention, since the data on the food eaten or the date on the food remaining on the conveyor line without being eaten over a predetermined time are surely obtained without the need to attach the IC tag to every plate used, the initial cost can be reduced as a whole.

DESCRIPTION OF THE PREFERRED EMBODIMENT

Figure 1:
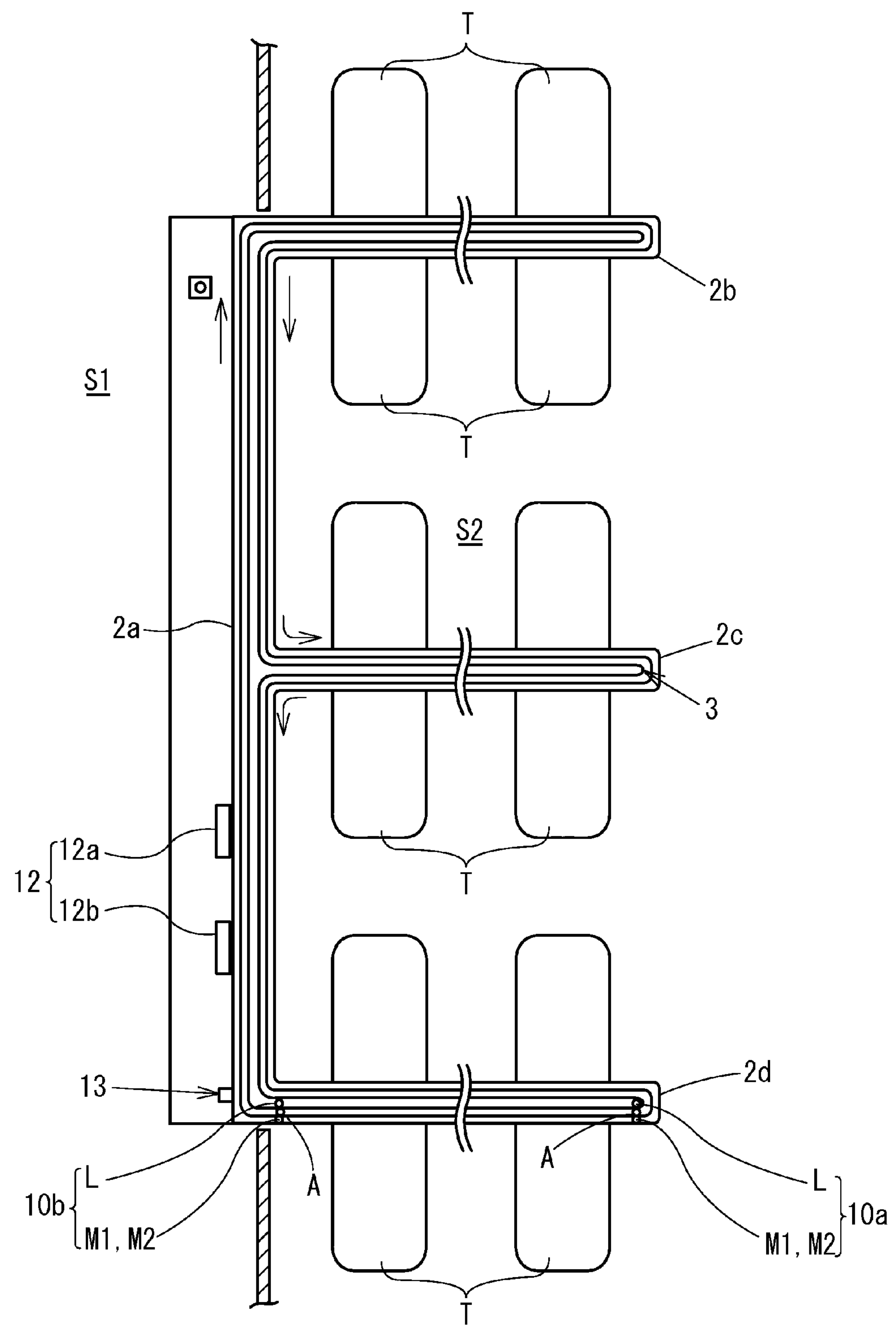
FIG. 1 is an illustration, illustrating an interior of a sushi restaurant using a food conveying apparatus as viewed from top.

FIG. 1 illustrates an interior of a sushi restaurant as viewed from top.

Figure 2:
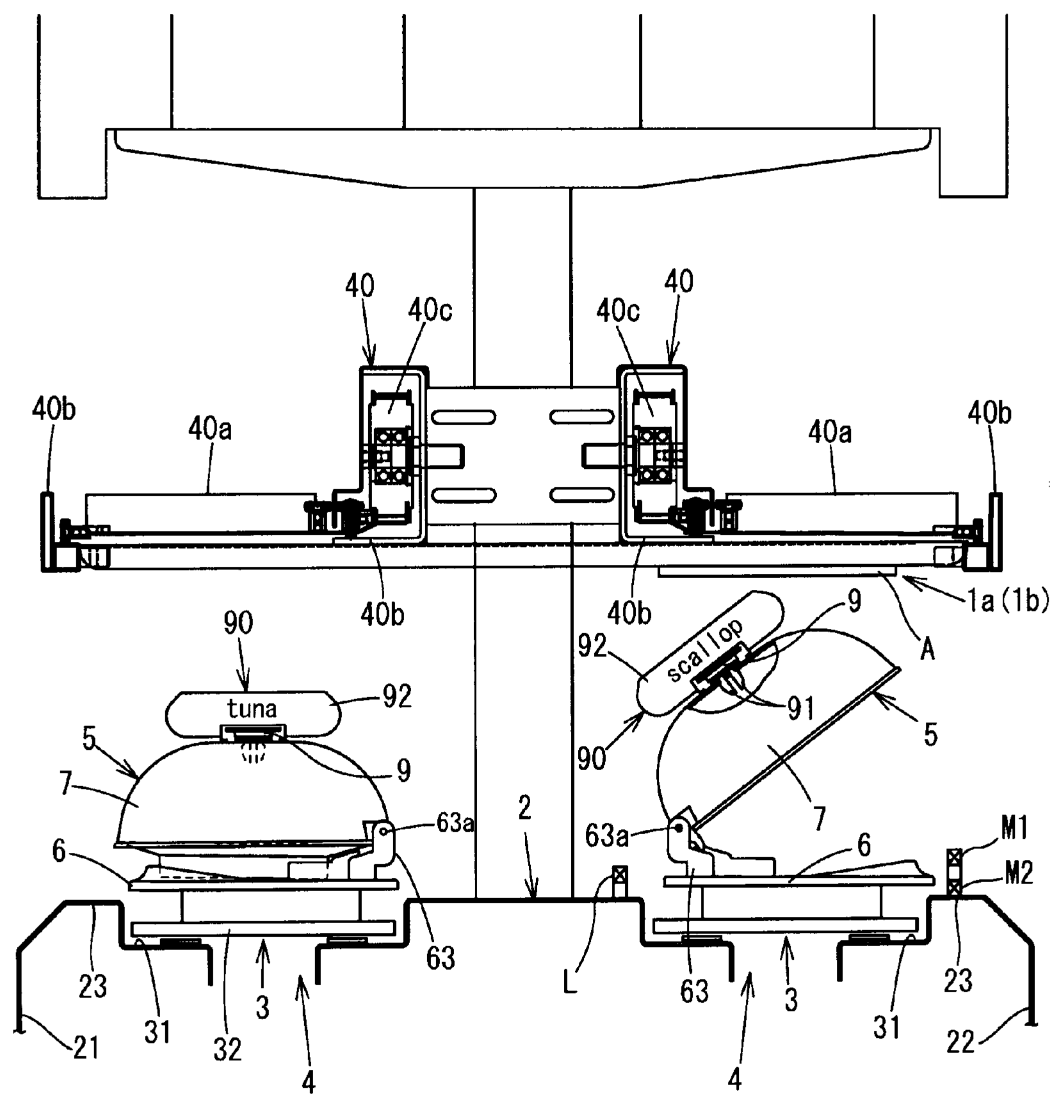
FIG. 2 is an enlarged sectional view of a relevant constitution part of the food conveying apparatus.

As shown in FIGS. 1 and 2, this sushi restaurant is provided with tables T arranged in the customer section S2, a partition housing 2 extending along the front side of the kitchen section S1 and the respective tables T, and a food conveying apparatus 4 arranged on the partition housing 2 in an orbiting manner to convey food, such as sushi, which is served on a plate P in the kitchen section S1, to the respective tables T.

As shown in FIG. 2, the partition housing 2 is formed in substantially a box shape in cross section, using side walls 21, 22 which are oppositely disposed with a predetermined space, a top wall 23 connecting between upper ends of the side walls 21, 22, and a bottom wall connecting between lower ends of the same. The partition housing 2 comprises a first housing portion 2*a* which is arranged along the front side of the kitchen section S1 to partition the kitchen section S1 from the customer section S2, a second housing portion 2*b*, a third housing portion 2*c* and a fourth housing portion 2*d* which are curved at both longitudinal ends of the first housing portion 2*a* and are extended in parallel to the interior of the customer section S2. The tables T are arranged at the outside of the side walls 21, 22 of the second, third and fourth housing portions 2*b*, 2*c*, 2*d*.

A conveyor line 3 of a food conveying apparatus 4 comprises, as shown in FIG. 2, a recess 31 formed in the top wall 23 of the housing portions 2*a*, 2*b*, 2*c*, 2*d*, and an endless flat chain conveyor 32 disposed in the recess 31 and moved in circulation via motor drive. The flat chain conveyor 32 forms the conveyor line 3 as is set forth in Claims.

A plate P, which is cited as an example of the plate in the invention, comprises a flat plate part P1 of a circular shape as viewed from top, and a base part P2 of cylindrical shape which is formed to extend downwardly from the bottom of the flat plate part P1.

In FIG. 2, a reference numeral 40 designates an ordered-food carrying device arranged over the conveyor line 3 of the food conveying apparatus 4. The ordered-food carrying devices 40 are separately provided at positions over forward and return routes of the conveyor line 3 of the food conveying apparatus 4, respectively.

Each ordered-food carrying device 40 comprises a carrying member 40*a* of carrying means for carrying an ordered food thereon, a pair of right and left guide rails 40*b* of a track along which the carrying member 40*a* is moved, and a driving unit 40*c* for driving the carrying member 40*a* along the guide rails 40*b*.

Figure 6:
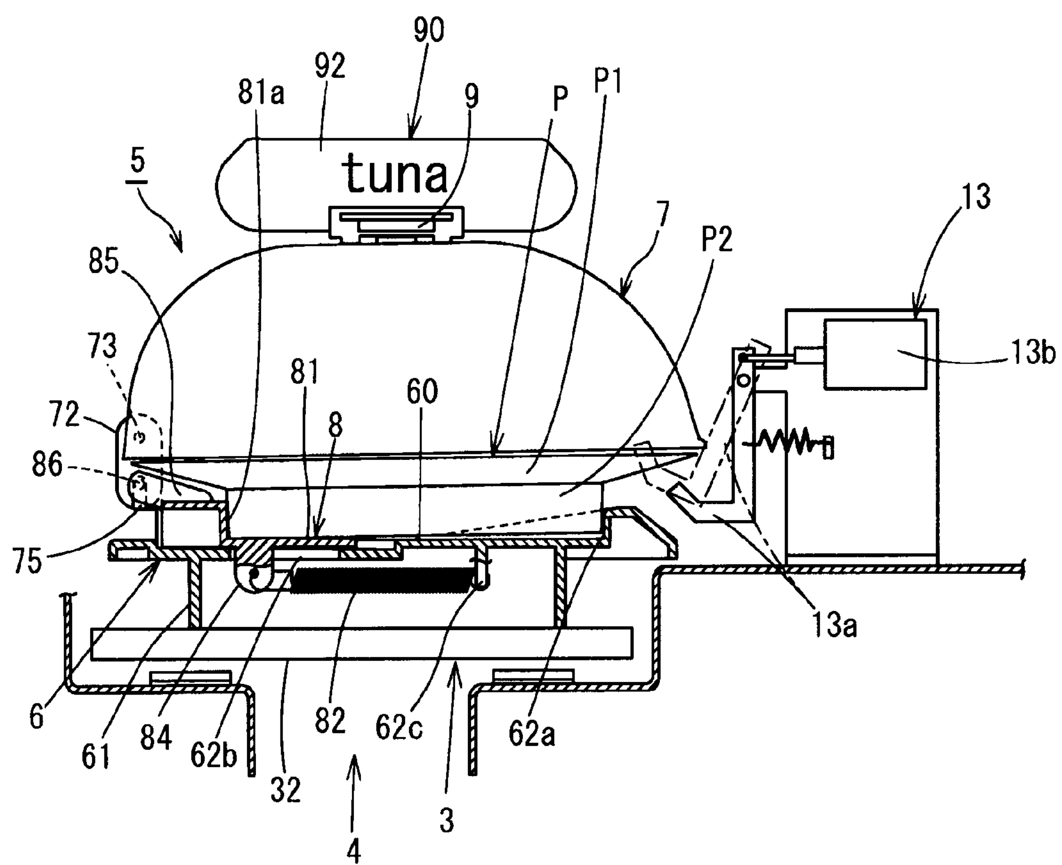
FIG. 6 is a diagrammatic illustration of a relevant part of the food conveying apparatus.

The food plate carrier designated by symbol 5 in the drawing is put on a flat chain conveyor of the food conveying apparatus 4, when used. Explanation of the food plate carrier 5 is given next. As shown in FIG. 6 as well, the food plate carrier 5 basically comprises a mounting platform 6 having a plate resting portion 60 for resting the plate P thereon, a cover 7 for covering the plate resting portion 60 of the mounting platform 6, and an open and close mechanism 8 for allowing the cover 7 to close in response to the plate P being placed on the plate resting portion 60 and allowing the cover 7 to open in response to the plate P being taken out therefrom.

Figure 8:
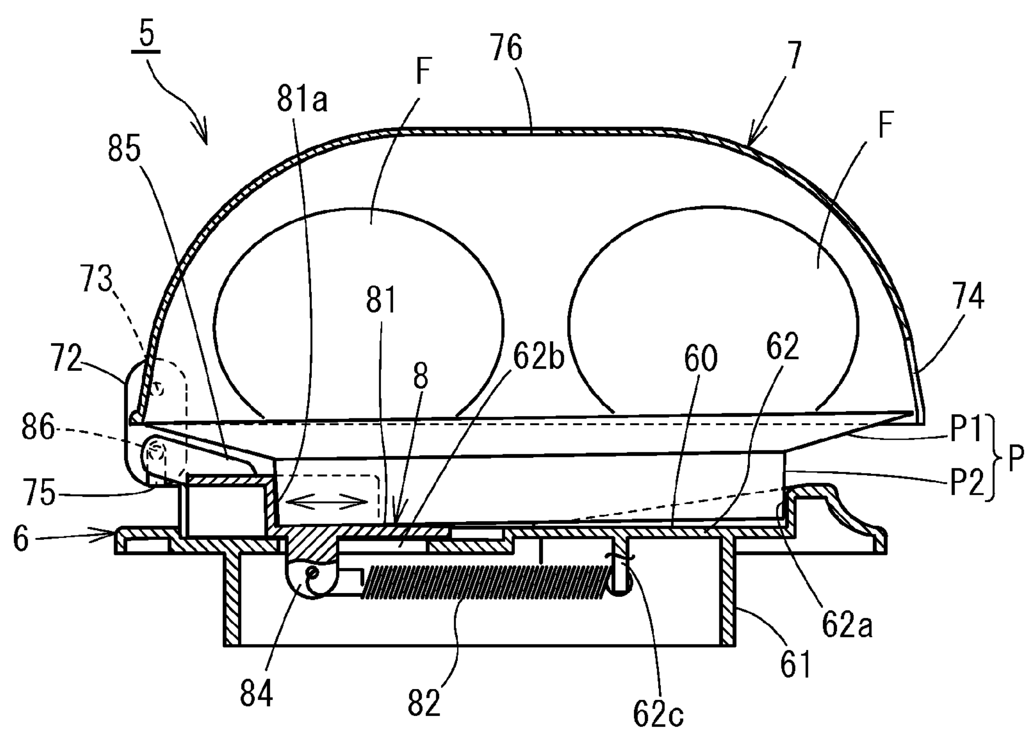
FIG. 8 is a sectional view of the food plate carrier in which a plate is rested.

The mounting platform 6 is so formed that the plate resting portion 60 is integrally formed at an upper end of a cylindrical base 61, as shown in FIG. 8 as well. The plate resting portion 60 comprises a mounting plate 62 formed in a circular disc shape as viewed from top, so that the plate P is placed on the mounting plate 62.

The mounting plate 62 has, at a top surface thereof, a stopper 62*a* of a shape to engage with an outer periphery of the base part P2 of the plate P at the bottom end. The stopper 62*a* has an inner periphery formed in a curved shape, as viewed from top, to contact with and extend around the outer periphery of the base part P2.

Figure 7:
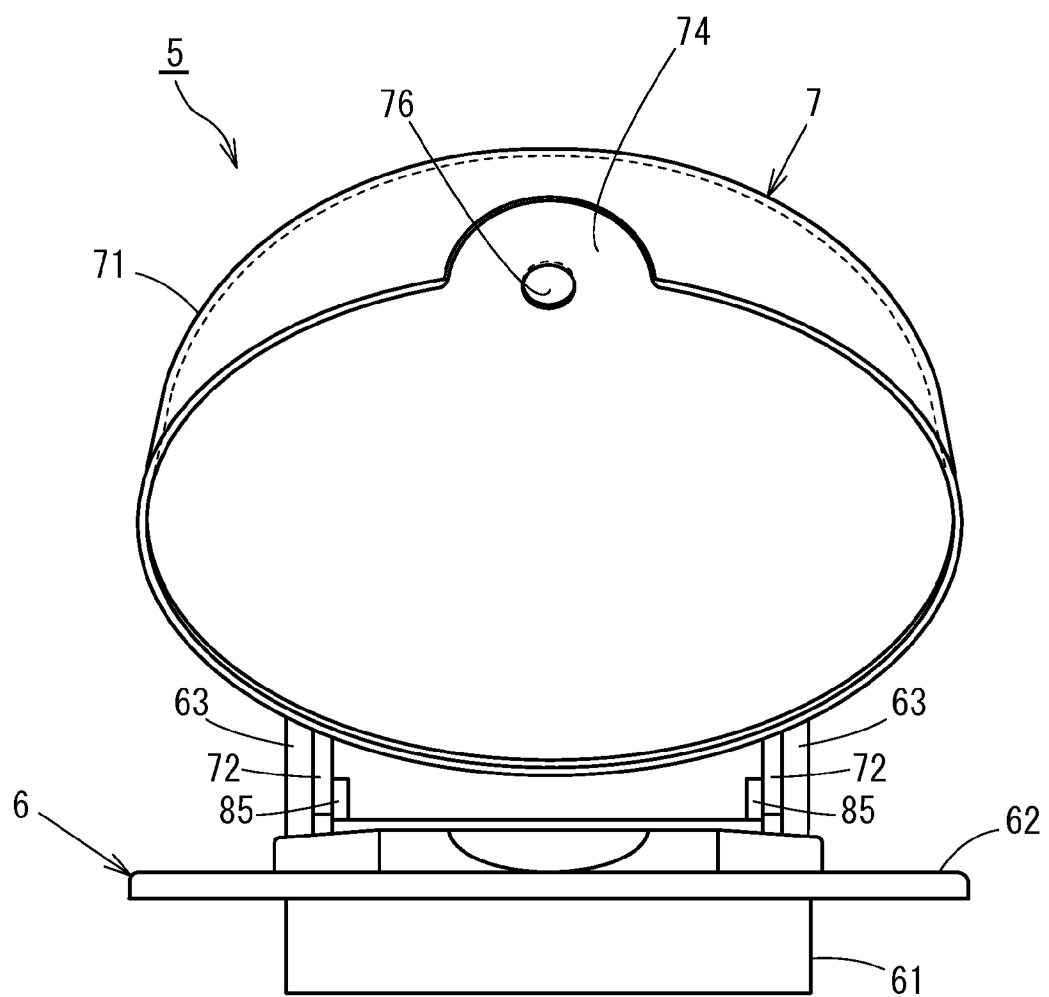
FIG. 7 is a front view of the food plate carrier with its cover being in an open state.

The cover 7 comprises, as shown in FIG. 7, a cap body 71 formed in a bowl shape, and a pair of right and left arms 72 extending downwardly from a rear end of the cap body 71. The cover 7 is mounted on the plate resting portion 60 so that it can open and close with respect to the top surface of the plate resting portion 60 so that the cap body 71 can cover the food F, e.g. sushi, on the plate P placed in the plate resting portion 60.

Specifically, a pivot 73 is integrally formed with each arm 72. The mounting plate 62 is provided, at a rear end portion thereof on the upper side, with a pair of right and left support lugs 63 which are located at the outside of the arms 72 so as to face the arms 72. The support lugs 63 have fitting holes 63*a* formed at upper portions thereof. The pivots 73 are fitted in the fitting holes 63*a*, whereby the cap body 71 is supported in such a manner as to pivot about the pivots 73 and swing in a vertical direction with respect to the plate resting portion 60.

The cap body 71 has, at a peripheral edge thereof, a cutout 74 of a size to allow one's fingers to pass through, so that when taking out the plate P from the interior of the cover, one can grasp a rim of the plate portion P1 with his fingers.

The open and close mechanism 8 comprises, as shown in FIG. 6 as well, an actuator 81 mounted on the top surface of the plate resting portion 60 of the mounting platform 6 in such a manner as to be slidable in the back and forth direction, and a coiled spring 82 for biasing the actuator 81 forwardly of the plate resting portion 60.

Figure 9:
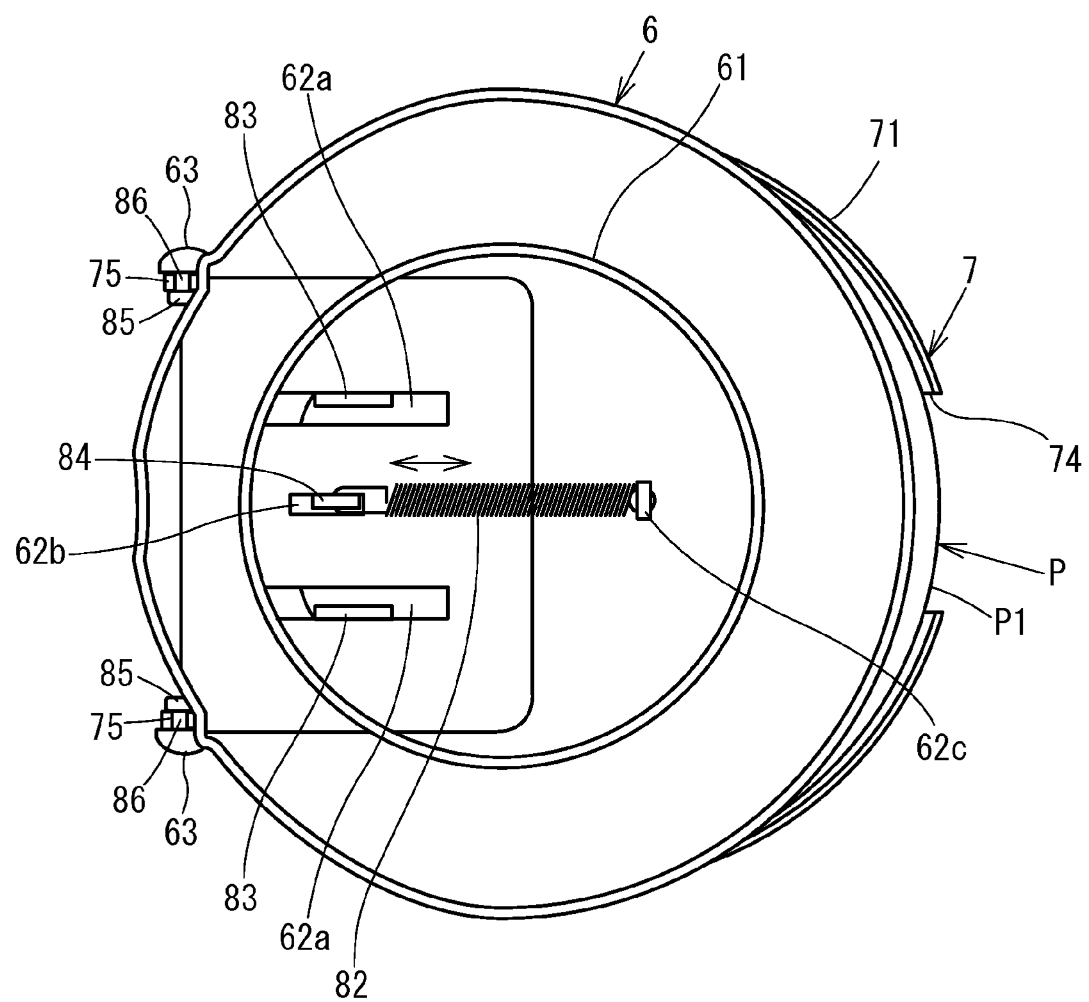
FIG. 9 is a bottom view of the food plate carrier in which a plate is rested.
Figure 10:
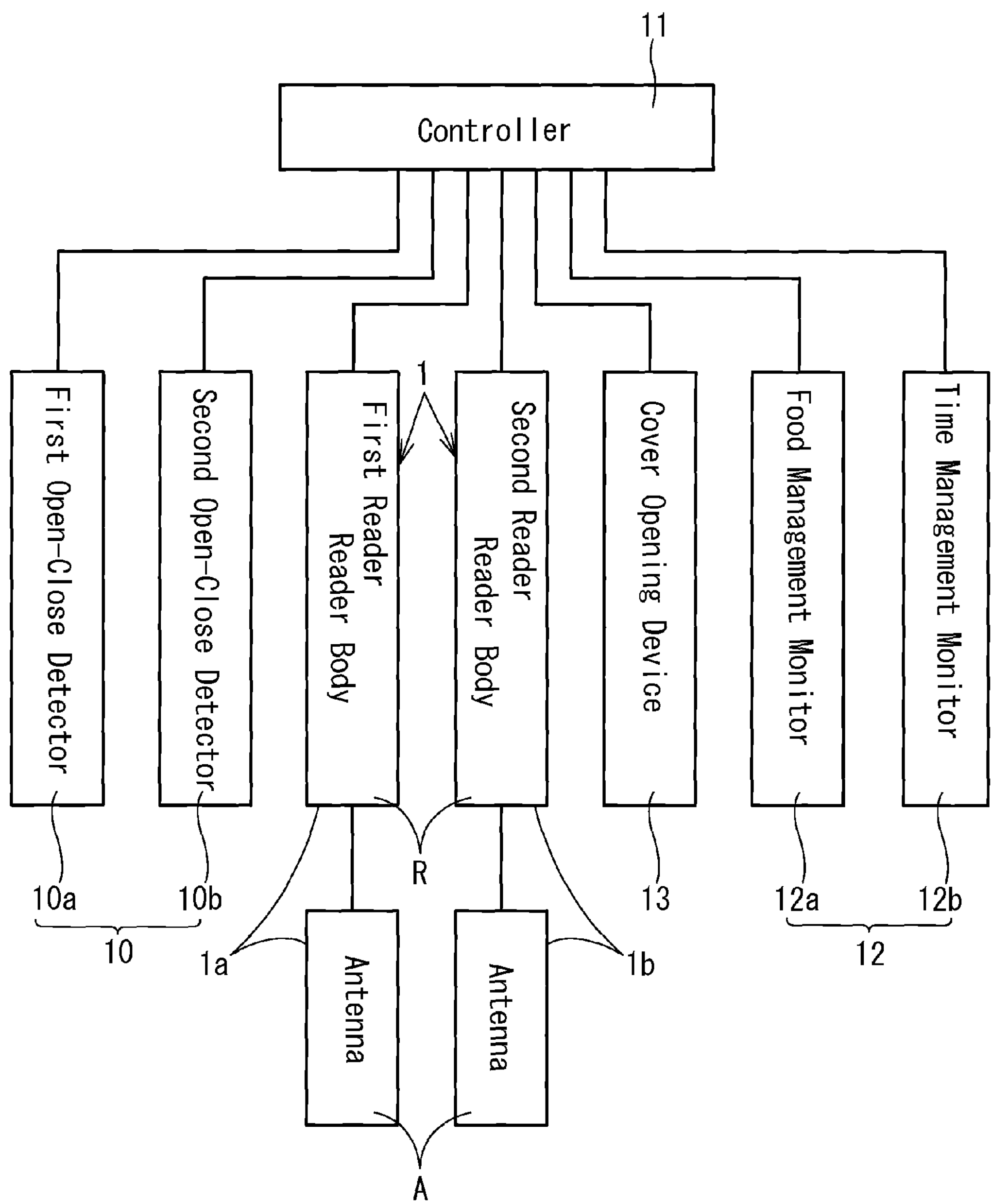
FIG. 10 is an explanatory drawing of a control system.

The actuator 81 has a pair of right and left guide members 83 and a fitting lug 84 to fit with a coiled spring 82 which are provided on the bottom side in a projecting manner, as shown in FIG. 9 as well. The guide members 83 are loosely fitted into guide slots 62*a* formed in the mounting plate 62 of the plate resting portion 60 to extend in a back and forth direction, so that they can freely move back and forth. The coiled spring 82 is bridged between the fitting lug 84 and a mounting lug 62*c* provided at a front portion of the mounting plate 62 on the bottom side. This enables the actuator 81 to move on the mounting plate 62 in the back and forth direction along the guide slots 62*a*. The actuator 81 is always biased forwards (in the rightward direction as viewed in FIG. 6) by a reaction force of the coiled spring 82.

Figure 5:
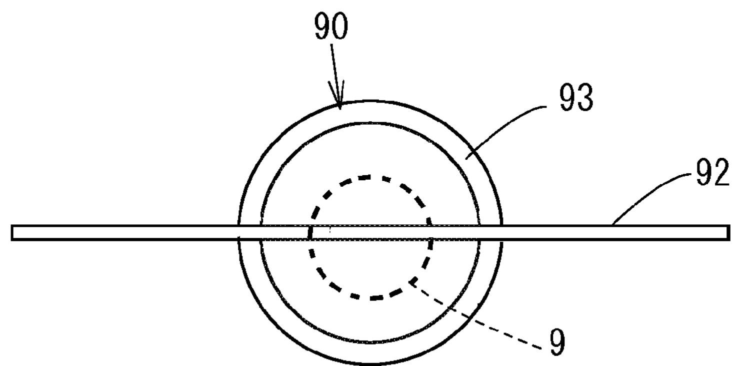
FIG. 5 is a plan view of the holder having the IC tag.

The actuator 81 has a receiving surface 81*a* formed in a curved shape, as viewed from top, to contact with the outer periphery of a base part P2 of the plate P. Also, the actuator 81 has, at both rear end portions thereof, a pair of right and left lugs 85 extending upwardly. The lugs 85 have, at the outside, connecting shafts 86 projecting therefrom. The connecting shafts 86 are fitted in slits 75 formed in the arms 72 at lower ends thereof. With the rearward sliding action of the actuator 81 (in the leftward direction as viewed in FIG. 5), the cap body 71 is swung in the closing direction, while on the other hand, with the forward sliding action of the actuator 81, the cap body 71 is swung in the opening direction.

In the food plate carrier 5, when the plate P is in the state of being not rested on the mounting plate 62 of the plate resting portion 60, the actuator 81 is forced to move forward with respect to the plate resting portion 60 by a reaction force of the spring 82, so that the cap body 71 is kept in the opened state, as shown in FIG. 7.

The usage of the food plate carrier 5 thus constituted will now be described.

After putting sushi F on the flat plate part P1 of the plate P, a cook holds the rim of the flat plate part P1 with his/her hand and puts the plate P on the mounting plate 62 of the food plate carrier 5 put on the flat chain conveyor 32, first. Then, he/she pushes the plate P backwards with respect to the mounting plate 62. Then, the actuator 81 is pushed through its bearing surface 81*a* by the periphery of the base part P2 of the plate P and is moved back. Then, the cover 7 at the slits 75 is pressed back by the connecting shafts 86 of the actuator 81, to cause the cap body 71 to pivot about the pivots 73 and swing in the direction of covering the mounting plate 62. When the plate P is moved back to a location at which the periphery of the base part P2 at the bottom end on the front side is engaged with the stopper 62*a*, the base part P2 is held at its front and rear portions in sandwich relation between the stopper 62*a* of the plate resting portion 60 and the receiving surface 81*a* of the actuator 81, as shown in FIG. 6. Thus, when the plate P is placed in the position where sushi F on the flat plate part P1 is covered by the cap body 71, the plate P is kept in position on the mounting platform 6 and the cap body 71 is also kept in its closed position, thus being kept from opening accidentally.

On the other hand, a customer holds a rim portion of the flat plate part P1 at its part located close to the cutout 74 of the cap body 71 with his/her hand and lifts it up. As a result of this, the base part P2 is released from the abutment with the stopper 62*a*. Then, the actuator 81 is moved back by the action of the spring 82, whereby the cap body 71 is opened and is kept in its opened position.

Thus, the use of the food plate carrier 5 for transporting sushi F can prevent the sushi F on the plate P from drying off obliviously. Also, the use of this food plate carrier 5 can prevent the sushi F from being touched by mistake by other customers.

The present invention is directed to a food management system for managing the food which is contained in the food plate carrier 5 and is transported by the food conveying apparatus 4. This food management system will be described next.

The food management system shown in the drawings comprises a disk-shaped IC tag 9, which is called RFID, fixedly attached to the food plate carrier 5, a reader 1 for reading the data written in the IC tag 9 of the food plate carrier 5 transported through the conveyor line 3, an open and close detector 10 for detecting opening and closing of the cover 7 of the food plate carrier 5, a controller 11 for computing the data on the food transported through the conveyor line 3, based on the data of the IC tag 9 read by the reader 1 and the data on the opening and closing of the cover 7 detected by the opening and closing detector 10, a monitor 12 on which various kinds of data calculated by the controller 11 is displayed, and a cover opening device 13 for driving the cover 7 of the food plate carrier 5 to open.

The controller 11 is constituted by a computer.

The IC tag 9 is attached to a holder 90 detachably fixed to a top of the cover 7.

Figure 3:
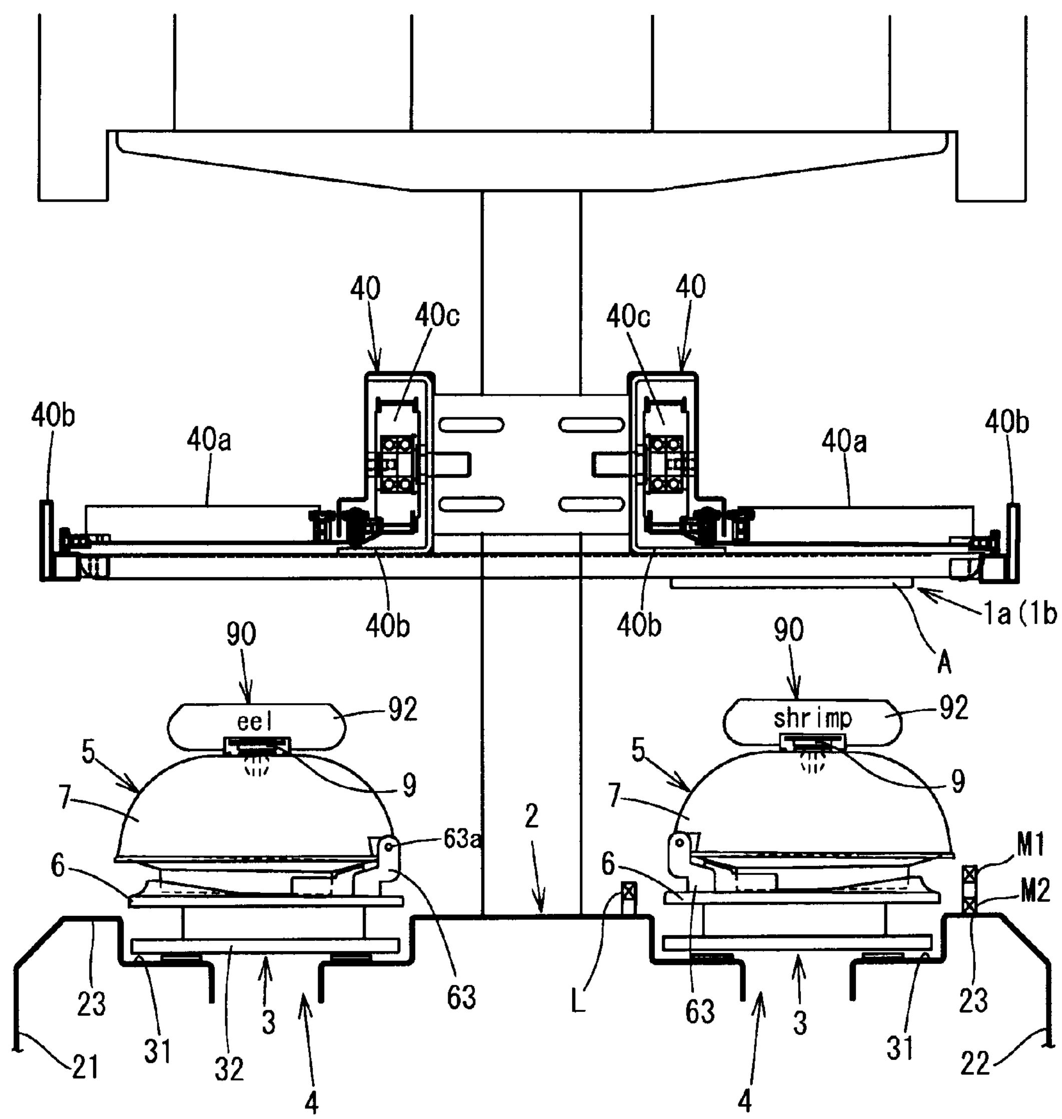
FIG. 3 is an enlarged sectional view of a relevant constitution part of the food conveying apparatus.
Figure 4:
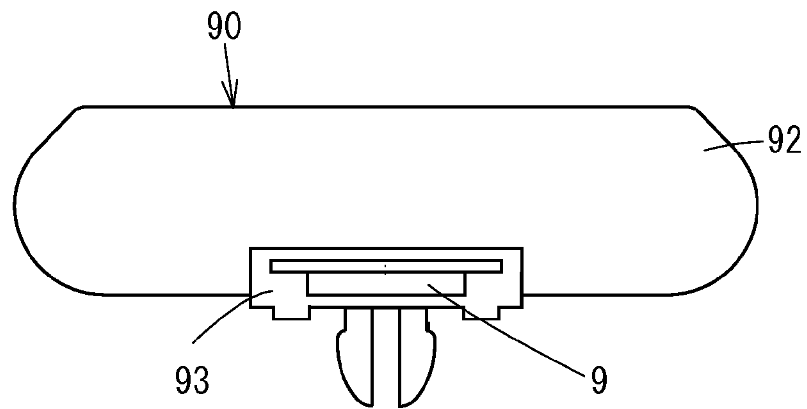
FIG. 4 is a front view of a holder having an IC tag.

The holder 90 comprises, as shown in FIG. 4 as well, a leg 91 to be inserted in a through-hole 76 at the top of the cover 7, a display portion 92 for the presentation of the food served, and a fitting portion 93 in which the IC tag 9 is detachably fixed. By inserting the leg 91 in the through-hole 76, as shown in FIG. 3, the holder 90 is detachably fixed to the cover 7.

An identification number and a corresponding food, both of which are written in the IC tag 9 at the fitting portion 93, are displayed in the display portion 92.

The reader 1 and the open and close detector 10 comprise a first reader 1*a* and a first open-close detector 10*a*, both of which are intended to obtain the data on the kind and number of food eaten, and a second reader 1*b* and a second open-close detector 10*b*, both of which are intended to obtain the data on the food remaining on the conveyor line 3 without being eaten for a predetermined time, respectively.

An antenna A, mentioned later, which forms the first reader 1*a* and the first open-close detector 10*a* are located in a fourth housing 2*d* at a portion thereof corresponding to an intermediate portion of the conveyor line 3 with respect to the conveying direction. Also, an antenna A, mentioned later, which forms the second reader 1*b* and the second open-close detector 10*b* are located in the fourth housing 2*d* at a portion thereof corresponding to an end portion of the conveyor line 3 with respect to the conveying direction.

An IC tag reader of a known structure, which consists of a reader body R and the antenna A, is used for the reader 1*a*, 1*b*. The antenna A is disposed over the conveyor line 3. The reader body R reads the identification number of the each IC tag 9 and an peculiar item number representing the kind of food as was given in advance by a writer.

The first and second open-close detectors 10*a*, 10*b* each consist of one light emitting element L and two photoreceptors M1, M2 which are arranged in a two-tiered manner, as shown in FIG. 1 as well. The light emitting element L is disposed in the conveyor line 3 at one side thereof with respect to the direction orthogonal to the extending direction of the conveyor line 3. Also, the photoreceptors M1, M2 are disposed in the conveyor line 3 at the other side thereof with respect to the direction orthogonal to the extending direction of the conveyor line 3.

The first and second open-close detectors 10*a*, 10*b* operate so that when the food plate carrier 5 passes through the respective readers 1*a*, 1*b*, a light emitted from the light emitting element L is blocked by the mounting platform 6 so as to be prevented from being received by the lower photoreceptor M2. If the cover 7 is then in the opened state by taking out the plate P from the food plate carrier 5, then the light emitted from the light emitting element L will be received by upper photoreceptor M1. On the other hand, if the cover 7 is then in the closed state with the plate P retaining in it, then the light emitted from the light emitting element L will be blocked by mainly the plate P so as to be prevented from being received by the upper photoreceptor M1.

The controller 11 operates so that when the data from the first reader 1*a* and the first open-close detector 10*a* are input in the controller 11, the kind and number of the eaten food are calculated from the data on the food in the IC tag as read by the first reader 1*a* and from the data on the opening and closing state of the cover 7 as detected by the first open-close detector 10*a* and then the result is displayed on a food management monitor 12*a* mentioned later.

In addition, the controller 11 operates so that when the data from the second reader 1*b* and the second open-close detector 10*b* are input in the controller 11, the data on the kind of the food remaining on the conveyor line 3 for a predetermined time without being eaten or the data on the food plate carrier 5 containing that food therein are calculated from the data on the food remaining on the conveyor line 3 for a predetermined time without being eaten, i.e., the data on the food of the IC tag as read by the second reader 1*b*, and the data on the opening and closing state of the cover 7 detected by the second open-close detector 10*b*, whereby when the food plate carrier 5 passes through a cover opening device 13 mentioned later, the cover opening device 13 is actuated and also the indication of the food remaining on the conveyor line 3 for a predetermined time without being eaten and the instruction to remove the plate P putting that food thereon from the food plate carrier 5 are displayed on a time management monitor 12*b* mentioned later.

The monitor 12 consists of the food management monitor 12*a* for displaying the kind and number of the eaten food and the time management monitor 12*b* for displaying the data on the food remaining on the conveyor line 3 for a predetermined time without being eaten. Both monitors 12*a*, 12*b* are set in the kitchen section S1.

The cover opening device 13 comprises, as shown in FIG. 6, a lifting lever 13*a* for lifting up the plate P rested in the food plate carrier 5, and a drive unit 13*b* for actuating the lifting lever 13*a*. By the operation of the drive unit 13*b*, the plate P is lifted up from the mounting platform 6 via the lifting lever 13*a*, and the cover 7 is moved to the open position.

Next, operation of the food maintenance system described above will be described.

The food plate carriers 5, each containing therein sushi of the food, are transported to the customer section S2 in order through the conveyor line 3, while a customer takes out the sushi (food) of his/her choice from the food plate carrier 5 to have it. When the customer takes out the sushi (food) together with the plate P from the food plate carrier 5, the cover 7 of the food plate carrier 5 is put in the opened state.

Then, when the food plate carrier 5 whose cover 7 is in the open state passes through the first reader 1*a* and the first open-close detector 10*a*, the first reader 1*a* reads the number representing the kind of the food and the peculiar number of the IC tag from the IC tag 9 and the first open-close detector 10*a* detects the food plate carrier 5 whose cover 7 is in the open state. Based on the data from the first reader 1*a* and the first open-close detector 10*a*, the controller 11 computes the kind and the number of the sushi (food) eaten and then displays them on the food management monitor 12*a* at appropriate intervals.

Thus, by preparing sushi (food) based on the data on the kind and number of the sushi (food) displayed on the food management monitor 12*a*, cooking stuffs can promptly replenish the emptied food plate carriers 5 returning to the kitchen section S1 with the same sushi (food) as eaten and can transport them into the customer's section S2.

On the other hand, when the food plate carrier 5 whose cover 7 is closed passes through the second reader 1*b* and the second open-close detector 10*b*, the second reader 1*b* reads the number representing the kind of the food and the peculiar number of the IC tag from the IC tag 9 and the second open-close detector 10*b* detects the food plate carrier 5 whose cover 7 is in the closed state. Based on the data from the second reader 1*b* and the second open-close detector 10*b*, the controller 11 discriminates on whether the staying time, during which the food plate carrier 5 whose cover 7 is closed to contain sushi (food) therein remains on the conveyor line 3, exceeds a predetermined time or on whether the sushi contained in the food plate carrier 5 remains on the conveyor line 3 over a predetermined time without being eaten.

Then, if the staying time of the sushi on the conveyor line 3 exceeds the predetermined time, then the lifting lever 13*a* of the cover opening device 13 is actuated via the controller 11 to force the cover 7 to open at the time when the food plate carrier 5 passes through the cover opening device 13. Further, at the time when the food plate carrier 5 comes close to the time management monitor 12*b*, the instruction to remove the sushi (food) contained in the food plate carrier 5 and the kind of that sushi are displayed on the time management monitor 12*b*.

Preferably, beep tones to invite cooking stuffs' attention to remove the sushi (food) are also emitted at the same time as the display on the time management monitor 12*b*.

When a cooking stuff removes the sushi from the food plate carrier 5 whose cover 7 is in the open state together with the plate P and then presses a removal confirmation button (not shown) associated with the controller 11, the data on the staying time of the food plate carrier 5 on the conveyor line 3 is reset. Thereafter, management of data on the staying time of sushi newly contained in the food plate container 5 is made.

For example when an arbitrary food plate carrier 3 is temporarily halted, the holder 90 fitted to the food plate carrier 5 halted may preferably be removed from the cover 7 and then remounted on another cover 7 of the food plate carrier 5 used for transporting sushi in an appropriate manner. This can enable efficient use of the holder 90 and the IC tag 9 without sitting unused.

Thus, the food management system mentioned above can facilitate the management of the kind and number of the eaten food and the time management of the food which remains on the conveyor line 3 without being eaten in excess of a predetermined time, without having to attach the IC tags to a large number of plates P, in other words, by simply attaching the IC tag to only the relevant food plate carriers 5.

In the embodiments illustrated above, sushi is taken as an example of the food contained in the food plate carrier 5, but the food contained therein is not limited to sushi. The foods which may be contained in the food plate carrier 5 include, for example, noodle, miso soup (bean paste soup), ice cream, or short cake.

While the illustrative embodiment of the present invention is provided in the above description, such is for illustrative purpose only and it is not to be construed restrictively. Modification and variation of the present invention that will be obvious to those skilled in the art is to be covered by the following claims.

What is claimed is:

1. A food management system for managing a food which is carried with its contained in a food plate carrier put on a conveyor line of a food conveying apparatus, wherein the food plate carrier comprises a mounting platform having a plate resting portion for resting thereon a plate on which food is put, and a cover for covering the plate resting portion of the mounting platform, the cover being attached to the mounting platform in such a manner as to open and close with respect to the plate resting portion, and wherein the food management system comprises an IC tag attached to the food plate carrier, a reader for reading data on the food from the IC tag of the food plate carrier carried via the conveyor line, an open-close detector for detecting opening and closing of the cover of the food plate carrier, and a controller for computing data on the food carried via the conveyor line, based on the data read by the reader and the data on the opening and closing of the cover detected by the open-close detector.

2. The food management system according to claim 1, wherein data on food eaten are calculated by the controller, based on the data from the reader and the open-close detector.

3. The food management system according to claim 1, wherein data on food remaining on the conveyor line without being eaten for a predetermined time are calculated by the controller, based on the data from the reader and the open-close detector.

4. The food management system according to claim 2, wherein data on food remaining on the conveyor line without being eaten for a predetermined time are calculated by the controller, based on the data from the reader and the open-close detector.

* * * * *